US010737217B2

(12) United States Patent
Naito (10) Patent No.: US 10,737,217 B2
(45) Date of Patent: Aug. 11, 2020

(54) EXHAUST GAS PURIFICATION DEVICE AND CO$_2$ RECOVERY SYSTEM

(71) Applicant: IHI Corporation, Koto-ku (JP)

(72) Inventor: Toshiyuki Naito, Koto-ku (JP)

(73) Assignee: IHI Corporation, Koto-ku (JP)

( * ) Notice: Subject to any disclaimer, the term of this patent is extended or adjusted under 35 U.S.C. 154(b) by 184 days.

(21) Appl. No.: 14/963,925

(22) Filed: Dec. 9, 2015

(65) Prior Publication Data
US 2016/0096139 A1   Apr. 7, 2016

Related U.S. Application Data

(63) Continuation of application No. PCT/JP2014/068095, filed on Jul. 7, 2014.

(30) Foreign Application Priority Data

Jul. 12, 2013   (JP) .................................. 2013-146377

(51) Int. Cl.
*B01D 53/78* (2006.01)
*B01D 53/00* (2006.01)
(Continued)

(52) U.S. Cl.
CPC ........... *B01D 53/78* (2013.01); *B01D 53/002* (2013.01); *B01D 53/504* (2013.01); *B01D 53/62* (2013.01);
(Continued)

(58) Field of Classification Search
CPC ...... B01D 53/78; B01D 53/002; B01D 53/75; B01D 53/504; B01D 53/62; C01B 32/50
See application file for complete search history.

(56) References Cited

U.S. PATENT DOCUMENTS 3,577,705 A * 5/1971 Sharlit ............... B01D 46/0032
55/283
4,164,547 A * 8/1979 Simko .................. B01D 53/507
422/111
(Continued)

FOREIGN PATENT DOCUMENTS

JP       7-500525        1/1995
JP       7-155537        6/1995
(Continued)

OTHER PUBLICATIONS

Espacenet English Translation of JPH1133254 (Year: 1999).*
(Continued)

*Primary Examiner* — Matthew D Krcha
(74) *Attorney, Agent, or Firm* — Oblon, McClelland, Maier & Neustadt, L.L.P.

(57) ABSTRACT

An exhaust gas purification device downstream of a wet desulfurizer for a combustor has a vessel body for intake of exhaust gas from the wet desulfurizer at a lower portion and discharge of the same at an upper end, an auxiliary desulfurizing portion with an injection nozzles for injection of an alkaline solution at a position above an inlet in the vessel body to purify the exhaust gas, bag filters above the injection nozzles to separate particles in the exhaust gas, backwashing nozzles for injection of compressed gas from above the bag filters for backwashing, a drain-receiving tank for reception of drain from the vessel body and a supply pump for supply of the drain in the drain-receiving tank as alkaline solution to the injection nozzles.

6 Claims, 4 Drawing Sheets

(51) Int. Cl.
  *B01D 53/50* (2006.01)
  *B01D 53/75* (2006.01)
  *B01D 53/62* (2006.01)
  *C01B 32/50* (2017.01)

(52) U.S. Cl.
  CPC .............. *B01D 53/75* (2013.01); *C01B 32/50* (2017.08); *B01D 2251/2062* (2013.01); *B01D 2251/304* (2013.01); *B01D 2251/402* (2013.01); *B01D 2257/302* (2013.01); *B01D 2257/504* (2013.01); *B01D 2258/0283* (2013.01); *Y02C 10/04* (2013.01); *Y02P 20/152* (2015.11)

(56) References Cited

U.S. PATENT DOCUMENTS

| | | | | |
|---|---|---|---|---|
| 4,774,071 | A * | 9/1988 | Jeffrey | B01D 53/1493 252/191 |
| 5,480,624 | A | 1/1996 | Kuivalainen | |
| 5,642,630 | A * | 7/1997 | Abdelmalek | B01D 53/1431 62/632 |
| 2002/0187083 | A1* | 12/2002 | Bundy | B01D 46/02 422/171 |
| 2004/0052696 | A1* | 3/2004 | Hopkins | B01D 45/06 422/177 |
| 2005/0028529 | A1* | 2/2005 | Bartlett | B01D 53/1475 60/772 |
| 2005/0056148 | A1* | 3/2005 | Sweeney | B01D 53/0407 95/90 |
| 2006/0239881 | A1* | 10/2006 | Nagayasu | B01D 53/485 423/240 R |
| 2011/0197760 | A1* | 8/2011 | Lindau | B01D 46/0036 95/11 |

FOREIGN PATENT DOCUMENTS

| | | | |
|---|---|---|---|
| JP | 11-333254 | 12/1999 | |
| JP | 2003-161427 | 6/2003 | |
| JP | 2005-46703 | 2/2005 | |
| JP | 2011-120981 | 6/2011 | |
| JP | 2012-50931 | 3/2012 | |
| JP | 2012-106163 | 6/2012 | |
| JP | 2012-143699 | 8/2012 | |
| JP | 2013-108680 | 6/2013 | |
| WO | WO-2012069899 A1 * | 5/2012 | ......... B01D 46/0067 |

OTHER PUBLICATIONS

U.S. Appl. No. 14/844,135, filed Sep. 3, 2015, Toshiyuki Naito.
U.S. Appl. No. 14/844,694, filed Sep. 3, 2015, Toshiyuki Naito.
U.S. Appl. No. 14/939,174, filed Nov. 12, 2015, Toshiyuki Naito.
U.S. Appl. No. 14/941,774, filed Nov. 16, 2016, Toshiyuki Naito.
International Search Report dated Aug. 12, 2014 in PCT/JP2014/068095 filed Jul. 7, 2014.

* cited by examiner

EXHAUST GAS PURIFICATION DEVICE AND $CO_2$ RECOVERY SYSTEM

TECHNICAL FIELD

The present disclosure relates to an exhaust gas purification device and a $CO_2$ recovery system.

Background Art

For environmental conservation, exhaust gas from a combustor such as a coal-fired boiler for air combustion of pulverized coal, which contains granulous and gaseous impurities, has been treated by an exhaust gas treatment device having a denitrator, a dust collector, a desulfurizer and the like. The impurities contained in the exhaust gas from the coal-fired boiler are, for example, nitrogen oxides ($NO_x$), carbon dioxide ($CO_2$), sulfur oxides ($SO_x$), mercury (Hg), hydrogen chloride (HCl) and dust.

Meanwhile, an oxyfuel combustor using oxygen in lieu of air has been researched to reduce discharged carbon dioxide ($CO_2$) which is said to be one of causes of global warming; attention has been paid to an oxyfuel combustion type coal-fired boiler for oxyfuel combustion of pulverized coal. It has been proposed that exhaust gas produced by the oxyfuel combustion type coal-fired boiler and mainly constituted of carbon dioxide ($CO_2$) is treated by an exhaust gas treatment device having a denitrator, a dust collector, a desulfurizer and the like and resultant exhaust gas with higher concentration of carbon dioxide is guided to a $CO_2$ recovery apparatus for compression and cooling and then distillation and heat-exchange into liquefied carbon dioxide. Ways having been investigated are, for example, conveyance of the liquefied carbon dioxide obtained by the $CO_2$ recovery apparatus to a destination by conveying means such as a ship or a vehicle and storage of the same in the ground as well as conveyance of the liquefied carbon dioxide increased in pressure through a pipeline to a destination and storage of the same in the ground.

The exhaust gas treatment device for the oxyfuel combustion type coal-fired boiler is disclosed, for example, in Patent Literature 1. Patent Literature 1 discloses that, in the exhaust gas treatment device, the exhaust gas from the oxyfuel combustion type coal-fired boiler is treated by the denitrator, the dust collector and the desulfurizer to remove impurities in the exhaust gas, the exhaust gas made free from the impurities being guided to the $CO_2$ recovery apparatus for liquefaction.

CITATION LIST

Patent Literature

Patent Literature 1: JP 2011-120981A

SUMMARY

Technical Problems

In order to make exhaust gas discharged from an oxyfuel combustion type coal-fired boiler into liquefied carbon dioxide, using a $CO_2$ recovery apparatus, a plurality of compressors and a plurality of coolers are required to provide the exhaust gas having pressure and temperature suitable for liquefaction. Such compressors are much expensive and therefore, in order to work out the $CO_2$ recovery apparatus, it is important to reduce a size and thus a cost of the compressors. Moreover, it is much important that the compressors can be operated stably.

It is, however, hard to remove impurities in exhaust gas by the exhaust gas treatment device shown in Patent Literature 1 with a higher removal ratio; part of the impurities remain in the exhaust gas discharged from the exhaust gas treatment device.

Among the impurities, sulfur oxides ($SO_x$) is made contact with and dissolved in water into sulfuric acid ($H_2SO_4$); hydrogen chloride (HCl) is dissolved in water into hydrochloric acid; and nitrogen dioxide ($NO_2$) as the nitrogen oxides is made contact with and dissolved in water into nitric acid ($HNO_3$). Thus, in the desulfurizer which is low in reaction temperature and is arranged on a downstreammost side of the exhaust gas treatment device, sulfuric acid produced from sulfur oxides and discharged downstream of the desulfurizer may bring about corrosion of the compressors.

In order to prevent the compressors from being corroded, the compressors must be produced with high-class material, which disadvantageously increases installation cost. Moreover, when impurities remain in the exhaust gas as mentioned in the above, an amount of exhaust gas to be treated is increased upon treatment of the exhaust gas guided to the $CO_2$ recovery apparatus, disadvantageously resulting in increase in size of the compressors. Moreover, any remaining impurities disadvantageously lower a purity degree of $CO_2$.

Known as the desulfurizer is a wet desulfurizer which employs a lime/gypsum (calcium sulfate) method (wet desulfurization method) using cheap lime. However, the exhaust gas treated by the wet desulfurizer still has impurities remaining; and calcium sulfate particles (impurities) produced by the desulfurization reaction of the wet desulfurizer are contained in the exhaust gas. Thus, the calcium sulfate particles from the wet desulfurizer are guided to the compressors and attached to and accumulated in the compressor, turbine blades and the like. This disadvantageously increases maintenance of the compressors to reduce an operating rate of the installation.

Meanwhile, in the air combustion type coal-fired boiler, the exhaust gas treated by the wet desulfurizer is guided to a stack. In this case, in order to prevent white smoke due to condensation of steam from being discharged from the stack, a repeater is arranged just upstream of the stack to enhance the temperature of the exhaust gas through heat exchange with that upstream of the desulfurizer in the exhaust gas treatment device, thereby preventing generation of the white smoke. However, when the exhaust gas containing calcium sulfate particles is discharged from the desulfurizer as mentioned in the above, disadvantageously the calcium sulfate particles are attached to and accumulated in the reheater and stack, so that maintenance work for removing the particles attached to and accumulated in the reheater and stack becomes troublesome.

The disclosure was made in view of the above-mentioned conventional problems and has its object to provide an exhaust gas purification device and a $CO_2$ recovery system which can remove impurities in exhaust gas treated by a wet desulfurizer for a combustor with simple construction.

Solution to Problems

The disclosure is directed to an exhaust gas purification device for an air or oxyfuel combustor and arranged downstream of a wet desulfurizer for exhaust gas treatment, characterized by comprising a vessel body with an inlet and an outlet at a lower portion and a top end thereof, respectively, exhaust gas from the wet desulfurizer being introduced into and discharged from the vessel body through the inlet and the outlet, respectively, an auxiliary desulfurizing portion having injection nozzles for injecting an alkaline solution at a position in the vessel body above the inlet to purify the exhaust gas, bag filters fixed through a mounting plate to the vessel body at a position in the vessel body above the injection nozzles for separating particles in the exhaust gas purified with the alkaline solution, backwashing nozzles arranged above the bag filters for injecting compressed gas to backwash the bag filters, a drain-receiving tank for receiving drain from the vessel body and a supply pump for supplying the drain in the drain-receiving tank as alkaline solution to the injection nozzles.

In the exhaust gas purification device, it is preferable that a mist eliminator is arranged in the vessel body at a position between the injection nozzles and the bag filters above the injection nozzles.

Preferably, the exhaust gas purification device further comprises an alkaline solution addition device for supplying the alkaline solution to the drain-receiving tank.

Preferably, the exhaust gas purification device further comprises a backwashing device for detecting any differential pressure between upstream and downstream sides of the bag filters and conducting backwashing using the backwashing nozzles on the basis of a detected differential pressure.

In the exhaust gas purification device, the vessel body may comprise first and second vessel bodies with changeover valves for changeover of a state that the exhaust gas is passed through the first vessel body and a state that the exhaust gas is passed through the second vessel body.

The disclosure is directed to a $CO_2$ recovery system providing a $CO_2$ recovery apparatus downstream of a wet desulfurizer arranged for an oxyfuel combustor to conduct exhaust gas treatment and comprising at least compressors and aftercoolers for cooling exhaust gas compressed by the compressors to thereby discharge condensed drains, thereby liquefying $CO_2$, the system characterized by comprising, between the wet desulfurizer and the compressors, an exhaust gas purification device comprising a vessel body with an inlet and an outlet at a lower portion and a top end thereof, respectively, exhaust gas discharged from the wet desulfurizer being introduced into and discharged from the vessel body through the inlet and the outlet, respectively, an auxiliary desulfurizing portion having injection nozzles for injecting an alkaline solution at a position in the vessel body above the inlet to purify the exhaust gas, bag filters fixed through a mounting plate to the vessel body at a position in the vessel body above the injection nozzles for separating particles in the exhaust gas purified with the alkaline solution, backwashing nozzles arranged above the bag filters for injecting compressed gas to backwash the bag filters, a drain-receiving tank for receiving drain from the vessel body and a supply pump for supplying the drain in the drain-receiving tank as at least part of the alkaline solution to the injection nozzles, and an alkaline solution addition device for supplying to the drain-receiving tank the alkaline solution obtained by adjusting pH of the drains from the aftercoolers.

In the $CO_2$ recovery system, it is preferable that $CO_2$ gas compressed by the compressors is supplied to the backwashing nozzles.

Advantageous Effects

An exhaust gas purification device and a $CO_2$ recovery system according to the disclosure can exhibit an excellent effect that impurities in exhaust gas treated by a wet desulfurizer for a combustor can be effectively removed with simple construction.

DESCRIPTION OF EMBODIMENTS

Embodiments of the disclosure will be described in conjunction with attached drawings.

Figure 1:
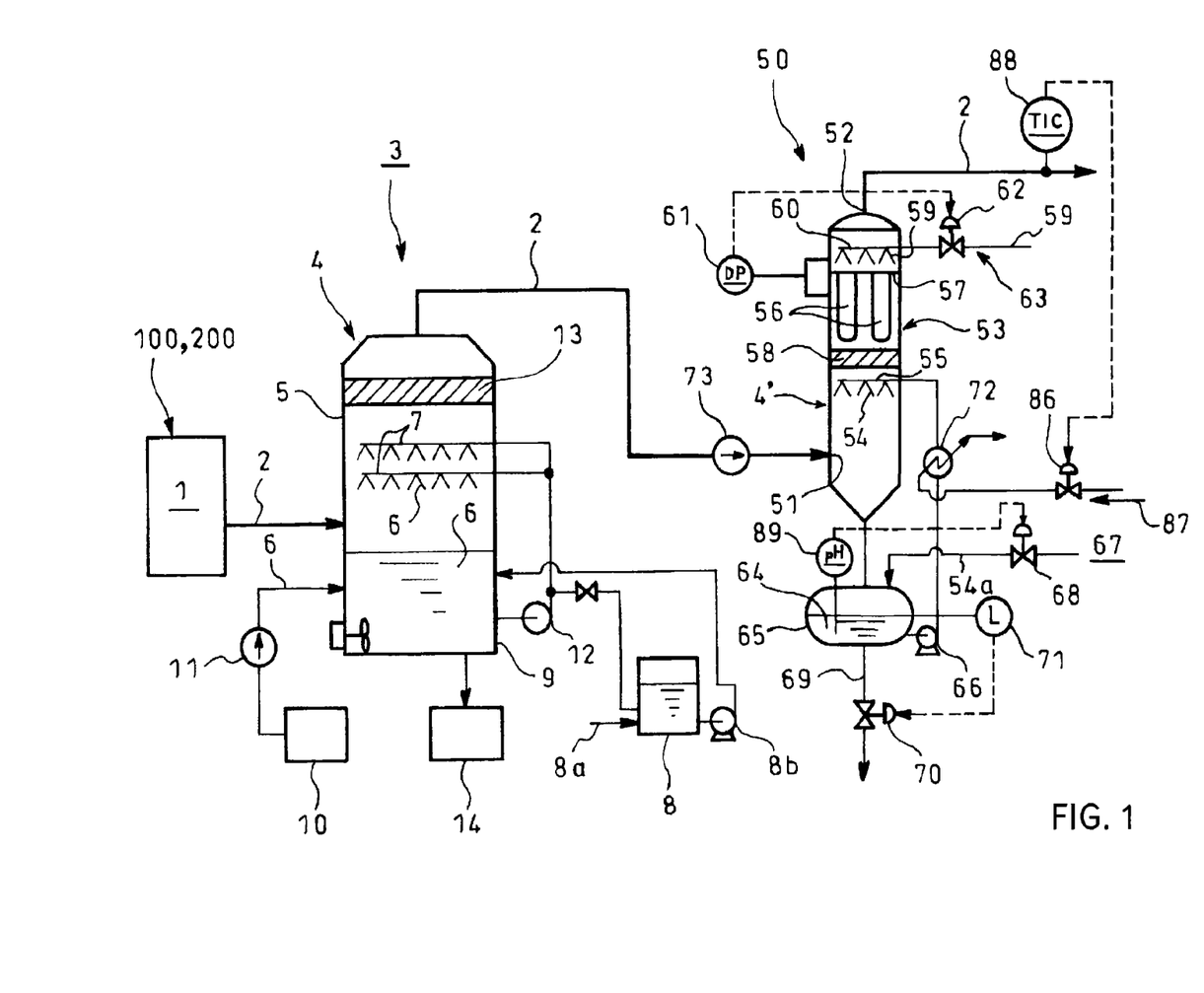
FIG. 1 is a block diagram showing an embodiment of an exhaust gas purification device according to the disclosure.

FIG. 1 shows an embodiment of an exhaust gas purification device 50 arranged downstream of an exhaust gas treatment device 3 which conducts an exhaust gas treatment for a combustor 1 comprising a pulverized-coal-fired boiler. The combustor 1 may be an oxyfuel combustor 100 or an air combustor 200. The exhaust gas purification device 50 may be applied to either of the oxyfuel and air combustors 100 and 200 as the combustor 1.

The combustor 1 comprising the pulverized-coal-fired boiler is provided with an exhaust gas treatment device 3 for removal of impurities in the exhaust gas 2 from the combustor 1. The exhaust gas treatment device 3 is provided with, for example, a denitrator, a dust collector and a desulfurizer.

Typically used as the desulfurizer is a wet desulfurizer employing lime/gypsum (calcium sulfate) method. The wet desulfurizer, which lowers a temperature of the exhaust gas 2, is usually arranged on a downstreammost side of the exhaust gas treatment device 3. In FIG. 1, only the wet desulfurizer 4 arranged on the downstreammost side is shown and other components constituting the exhaust gas treatment device 3 such as the denitrator and the dust collector are abbreviated in the figure.

The wet desulfurizer 4 comprises an absorption column 5 to which the exhaust gas from the combustor 1 is introduced through a lower side portion of the column. Arranged in an upper portion of the absorption column 5 is spray nozzles 7 which inject absorbing liquid 6 in the form of slurry containing limestone and the like to make gas-liquid contact with the exhaust gas 2. An inner lower portion of the absorption column 5 is a tank portion 9 for storage of the absorbing liquid 6 having absorbed sulfur oxides. Supplied to the tank portion 9 through a pump 11 is the absorbing liquid 6 in the form of limestone slurry produced by an absorbing liquid producing device 10. The absorbing liquid 6 in the tank portion 9 is supplied through a circulation pump 12 to the spray nozzles 7. The absorbing liquid 6 at an outlet side of the circulation pump 12 is partly taken by a mixing tank 8 into which oxidizing air 8a is blown for oxidization of the slurry, the oxidized slurry of the absorbing liquid 6 being returned by a pump 8b to the tank portion 9. The absorbing liquid 6 extracted from the tank portion 9 of the absorption column 5 is supplied to a calcium sulfate production device 14 for production of calcium sulfate. Arranged in a top of the absorption column 5 is a mist eliminator 13; the exhaust gas 2 made free from mist by the mist eliminator 13 is guided to flow downstream from the top of the absorption column 5.

In the wet desulfurizer 4, it is hard to remove, with a high removal ratio, the impurities in the exhaust gas 2 from the combustor 1 comprising the pulverized-coal-fired boiler. Thus, in the exhaust gas 2 from the wet desulfurizer 4, there still remains part of the impurities.

In order to remove the impurities in the exhaust gas from the wet desulfurizer 4, the exhaust gas purification device 50 is arranged downstream of the wet desulfurizer 4.

The exhaust gas purification device 50 comprises a vessel body 53 which receives the exhaust gas 2 from the wet desulfurizer 4 through an inlet 51 on a lower side portion of the body and discharges the same through an outlet 52 on an upper end of the body. The vessel body 53 has an auxiliary desulfurizing portion 4' with an injection nozzle 55 at a position in the body above the inlet 51 for injection of an alkaline solution 54 downward (to face with the exhaust gas 2) to purify the exhaust gas 2.

Arranged in the vessel body 53 at a position above the injection nozzle 55 are bag filters 56 which separate particles in the exhaust gas 2 purified with the alkaline solution 54 and which are fixed through a mounting plate 57 to the vessel body 53.

Arranged in the vessel body 53 between the injection nozzle 55 and the bag filters 56 arranged thereabove is a mist eliminator 58 which separates mist in the exhaust gas 2.

Arranged above the bag filters 56 are backwashing nozzles 60 which inject compressed gas 59 to backwash the bag filters 56. Further arranged is a differential pressure sensor 61 which detects any pressure difference (differential pressure) between upstream and downstream sides of the bag filters 56. Further provided are a flow rate control valve 62 which controls a supply of the compressed gas 59 on the basis of a detected differential pressure by the differential pressure sensor 61 as well as a backwashing device 63 which makes backwashing using the backwashing nozzles 60 on the basis of the detected differential pressure by the differential pressure sensor 61. Usable as the compressed gas 59 is air, $CO_2$ or any other clean gas.

Arranged below the vessel body 53 are a drain-receiving tank 65 which receives drain 64 from the vessel body 53 as well as a supply pump 66 which supplies the drain 64 in the drain-receiving tank 65 as the alkaline solution 54 to the injection nozzles 55. Arranged between the supply pump 66 and the injection nozzles 55 is a cooler 72 which cools the alkaline solution 54 through heat exchange with cooling fluid 87 such as water from a flow rate control valve 86. The alkaline solution 54 to be supplied to the injection nozzle 55 is cooled by the cooler 72, so that the alkaline solution 54 injected by the injection nozzle 55 is lowered in temperature, thereby enhancing the effect of removing the impurities in the exhaust gas 2. A temperature indication controller 88 is arranged which detects a temperature of the exhaust gas 2 from the outlet 52 of the vessel body 53 and controls a supply of the cooling fluid 87 by the flow rate control valve 86 so as to make the detected temperature equal to a preset temperature.

Supplied to the drain-receiving tank 65 is the alkaline solution 54a from the alkaline solution addition device 67 through a flow rate control valve 68. Usable as the alkaline solution 54a is, for example, sodium hydroxide (NaOH), ammonia ($-NH_3$), magnesium hydroxide ($Mg(OH)_2$) or a large quantity of water ($H_2O$) (generally water is weakly alkaline). The drain-receiving tank 65 is further provided with a level controller 71 which detects a level of the drain 64 and controls a control valve 70 incorporated in a discharge pipe 69 below the drain-receiving tank 65 so as to keep a detected level to a set value.

The drain-receiving tank 65 is further provided with a pH indication controller 89 which detects a pH of the alkaline solution 54 in the drain-receiving tank 65 and controls a supply of alkaline solution 54a by the flow rate control valve 68 so as to keep the detected pH to a preset pH.

Arranged upstream of the inlet 51 of the exhaust gas purification device 50 is a boost fan 73 which increases in pressure the exhaust gas 2 so as to compensate the pressure loss by the exhaust gas purification device 50.

Mode of operation of FIG. 1 embodiment is as follows.

As shown in FIG. 1, the exhaust gas purification device 50 is arranged downstream the wet desulfurizer 4 which is arranged for the combustor 1 comprising the coal-fired boiler to carry out the exhaust gas treatment, so that the exhaust gas 2 from the wet desulfurizer 4 is guided into the vessel body 53 of the exhaust gas purification device 50. The exhaust gas 2 introduced into the vessel body 53 is contacted with the alkaline solution 54 injected from the injection nozzles 55 constituting the auxiliary desulfurizing portion 4', so that any remaining granulous and gaseous impurities in the exhaust gas 2 are effectively removed.

In this connection, the particles (dust) in the exhaust gas 2 are alkaline and thus the drain 64 received by the drain-receiving tank 65 is alkaline, so that the supply of the drain 64 as the alkaline solution 54 to the injection nozzles 55 is effective. The drain-receiving tank 65 is further supplied with the alkaline solution 54a from the alkaline solution addition device 67, so that the impurity removal effect can be enhanced by controlling the pH of the alkaline solution 54 in the drain-receiving tank 65. The alkaline solution 54 to be supplied to the injection nozzles 55 is cooled by the cooler 72, so that the exhaust gas 2 contacted with low-temperature alkaline solution 54 is lowered in temperature to further enhance the impurity removal effect.

Thus, the exhaust gas treated by the wet desulfurizer 4 is contacted with low-temperatured alkaline solution 54 injected through the injection nozzles 55 of the auxiliary desulfurizing portion 4' in the exhaust gas purification device 50, so that the impurities in the exhaust gas 2 not removed by the wet desulfurizer 4 can be more reliably removed by the auxiliary desulfurizing portion 4'.

Any mist contained in the exhaust gas 2 having made free from the impurities in the auxiliary desulfurizing portion 4' is removed by the mist eliminator 58. Any remaining fine particles in the exhaust gas 2 having been not removed by contact with the alkaline solution 54 are removed during passing of the exhaust gas 2 through the bag filters 56, so that the clean exhaust gas 2 having no substantial impurities is taken from the exhaust gas purification device 50.

Because of the mist eliminator 58 arranged between the injection nozzle 55 and the bag filters 56, clogging of the bag filters 56 can be reduced to elongate a lifetime of the bag filters 56.

Further, the exhaust gas purification device 50 is provided with the backwashing device 63 which injects the clean compressed gas 59 on the basis of the pressure difference between the upstream and downstream sides of the bag filters 56, using the backwashing nozzles 60, to backwash the bag filters 56, so that any clogging of the bag filters 56 caused can be resolved. Thus, the exhaust gas purification device 50 can be operated stably for a long period of time.

As mentioned in the above, according to FIG. 1 embodiment, the exhaust gas purification device 50 with the auxiliary desulfurizing portion 4' is arranged downstream of the wet desulfurizer 4 for the combustor 1, so that any impurities in the exhaust gas 2 from the wet desulfurizer 4 can be effectively removed by simple construction.

Figure 2:
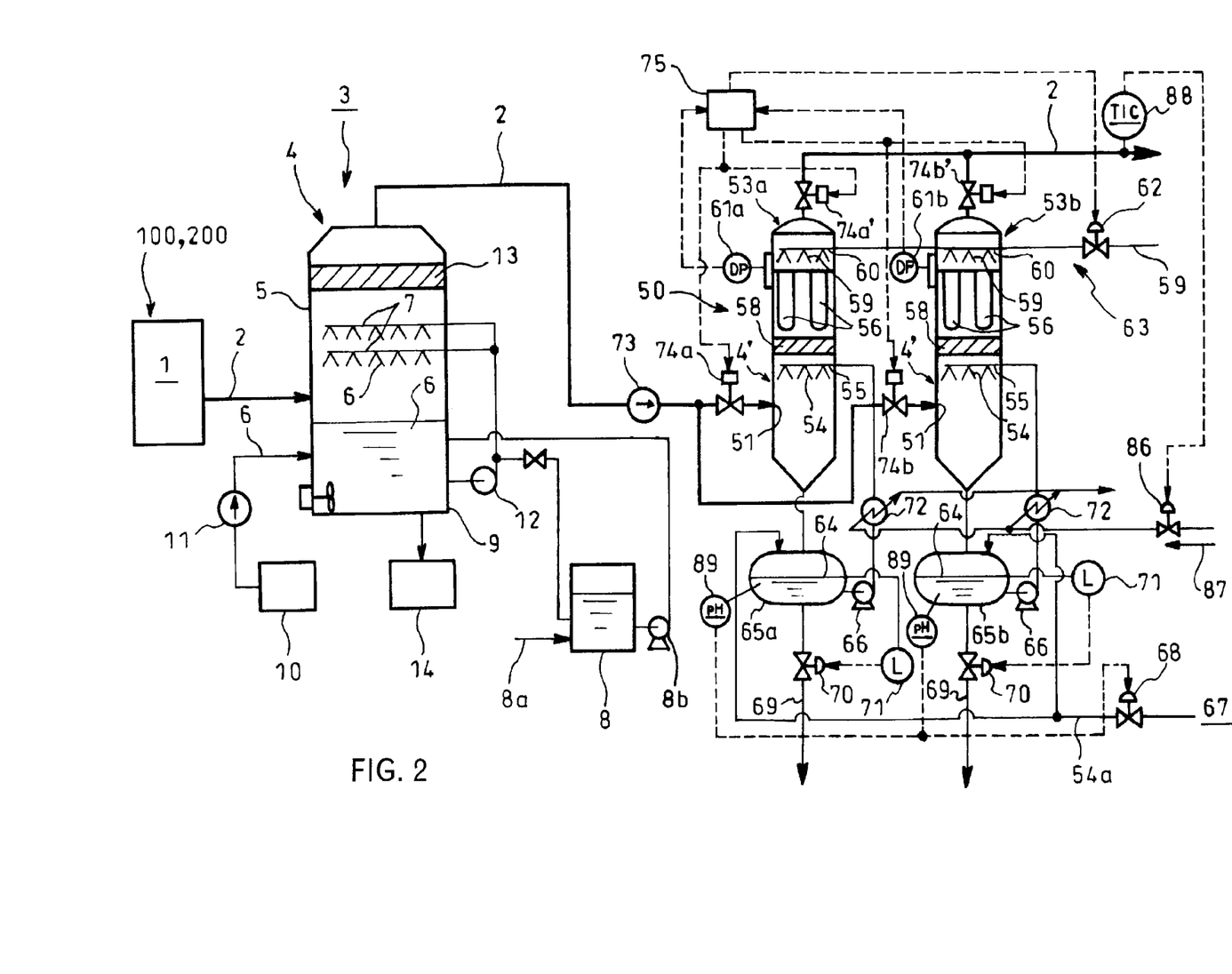
FIG. 2 is a block diagram showing a further embodiment of the exhaust gas purification device according to the disclosure.

FIG. 2 shows a further embodiment for the exhaust gas purification device 50 arranged downstream of the wet desulfurizer 4 for the combustor 1 comprising the coal-fired boiler. FIG. 2 embodiment is greatly different from FIG. 1 embodiment in that the exhaust gas purification device 50 comprises first and second vessel bodies 53*a* and 53*b*. The first and second vessel bodies 53*a* and 53*b* are provided with drain-receiving tanks 65*a* and 65*b*, respectively. Further, the first and second vessel bodies 53*a* and 53*b* are provided with changeover valves 74*a*, 74*a'* and 74*b*, 74*b'*, respectively, for changeover of a state that the exhaust gas 2 is passed through the first vessel body 53*a* and a state that the exhaust gas 2 is passed through the second vessel body 53*b*.

The first and second vessel bodies 53*a* and 53*b* are provided with differential pressure sensors 61*a* and 61*b* for detection of pressure difference between the upstream and downstream sides of their own bag filters 56, respectively, as well as a controller 75 to which detected differential pressures from the differential pressure sensors 61*a* and 61*b* are inputted. The controller 75 operates such that when, for example, the detected differential pressure by the differential pressure sensor 61*a* provided for the first vessel body 53*a* increases into a set value, the changeover valves 74*b* and 74*b'* of the other vessel body 53*b* are opened into activation while the changeover valves 74*a* and 74*a'* of the one vessel body 53*a* are closed into inactivation. Thus, the first and second vessel bodies 53*a* and 53*b* are alternately operated. In the unoperated vessel body, its bag filters 56 may be replaced during an unoperated time.

The controller 75 to which the detected differential pressures from the differential pressure sensors 61*a* and 61*b* are inputted operates, when the detected differential pressure of the operating vessel body becomes equal to the set value, to open the flow rate control valve 62 of the backwashing device 63 and inject compressed gas 59 by the backwashing nozzles 60 to conduct backwashing of the bag filters 56. If the detected differential pressure is still great despite repeated backwashing and clogging is not solved, the bag filters 56 are determined to have ended life-span and, as mentioned in the above, changeover is conducted for the first and second vessel bodies 53*a* and 53*b*.

Mode of operation of FIG. 2 embodiment is as follows.

As shown in FIG. 2, arranged downstream of the wet desulfurizer 4 for the combustor 1 comprising the coal-fired boiler is the exhaust gas purification device 50 for alternate or changeover use of first and second vessel bodies 53*a* and 53*b*, so that the exhaust gas 2 from the wet desulfurizer 4 and having some remaining impurities is introduced into either of the first and second vessel bodies 53*a* and 53*b*. Then, the exhaust gas 2 becomes contacted with the alkaline solution 54 injected by the injection nozzles 55 of the auxiliary desulfurizing portion 4', whereby the granulous and gaseous impurities in the exhaust gas 2 are effectively removed by the action of the alkaline solution 54.

Clogging of the bag filters 56 increases the detected differential pressure inputted from the differential pressure sensor 61*a* or 61*b* to the controller 75, so that the controller 75 controls the changeover of the changeover valves 74*a*, 74*a'* and 74*b*, 74*b'* to activate the unoperated vessel body and inactivate the operated vessel body. And, the bag filters 56 of the vessel body being not operated may be replaced to new ones, so that the exhaust gas purification device 50 can purify the exhaust gas 2, using the first or second vessel body 53*a* or 53*b* having always new bag filters 56.

As mentioned in the above, according to FIG. 2 embodiment, arranged downstream of the wet desulfurizer 4 for the combustor 1 is the exhaust gas purification device 50 having the first and second vessel bodies 53*a* and 53*b* each having the auxiliary desulfurizing portion 4', so that the impurities in the exhaust gas 2 from the wet desulfurizer 4 can be effectively removed, using simple construction. Further, by changeover use of the first and second vessel bodies 53*a* and 53*b*, the impurities can be effectively removed, using always new bag filters 56. Thus, the exhaust gas purification device 50 can be operated continuously an stably.

Figure 3:
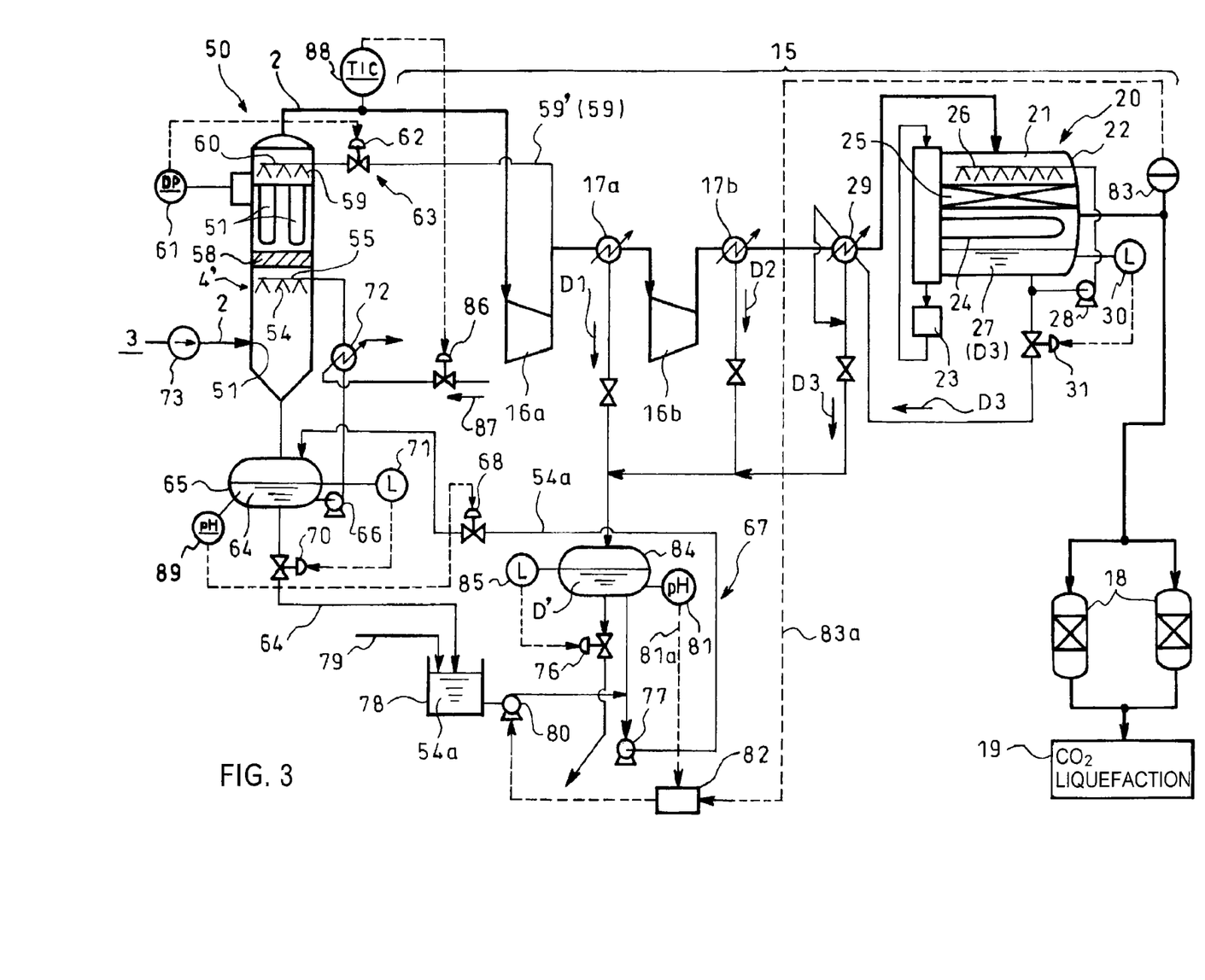
FIG. 3 is a block diagram showing an embodiment of a $CO_2$ recovery system with an exhaust gas purification device applied to an oxyfuel combustor.

FIG. 3 shows an embodiment of a $CO_2$ recovery system with an exhaust gas purification device applied to an oxyfuel combustor. Specifically, in the $CO_2$ recovery system where the combustor 1 shown in FIG. 1 is an oxyfuel combustor 100 and a $CO_2$ recovery apparatus 15 is arranged downstream of the wet desulfurizer 4 for the oxyfuel combustor 100, shown is the embodiment in which the exhaust gas purification device 50 in FIG. 1 is applied between the wet desulfurizer 4 and the $CO_2$ recovery apparatus 15. Arranged upstream of the exhaust gas purification device 50 in FIG. 3 is the wet desulfurizer 4 for the oxyfuel combustor 100, which is however abbreviated in FIG. 3 since it cannot be drawn in FIG. 3.

Meanwhile, the $CO_2$ recovery apparatus 15 has first and second compressors 16*a* (only one of them is shown in FIG. 3) for stepwise compression of the exhaust gas 2 to a target pressure, and aftercoolers 17*a* (only one of them is shown in FIG. 3) arranged downstream of the first and second compressors 16*a*, respectively, to cool the exhaust gas 2 and discharge drain D1 as condensed moisture by cooling. Further arranged are third and fourth compressors 16*b* (only one of them is shown in FIG. 3) downstream of the aftercoolers 17*a*, respectively, and aftercoolers 17*b* (only one of them is shown in FIG. 3) downstream of the third and fourth compressors 16*b*, respectively, to discharge drain D2.

Further arranged downstream of the aftercooler 17*b* are dryers 18. Further arranged downstream of the dryers 18 is a carbon dioxide liquefier 19 having a distillation column (not shown) and a heat exchanger (not shown) for liquefaction of $CO_2$. If mercury (Hg) concentration of the exhaust gas 2 is higher than its set target value, a mercury removal column may be arranged upstream of the dryers 18.

Operations of the $CO_2$ recovery apparatus 15 for liquefaction of carbon dioxide under various temperature and pressure conditions were studied to find out that it is preferable to increase a pressure of the exhaust gas 2 up to 2.5 MPa prior to supply thereof to the carbon dioxide liquefier 19 and thus, 2.5 MPa is set as the target pressure. Thus, in FIG. 3, the target pressure of 2.5 MPa is attained by the four compressors, i.e., the first and second compressors 16*a* and the third and fourth compressors 16*b*. The target pressure may be set at will.

In FIG. 3 embodiment, arranged downstream of the aftercooler 17*b* is a filler built-in cooler 20. The filler built-in cooler 20 comprises a cooler body 22 to provide a cooling space 21. Arranged in the cooling space 21 are a cooling pipe 24 connected to a freezer 23, a filler 25 arranged above the cooling pipe 24 and spray nozzles 26 arranged above the filler 25. The exhaust gas 2 is introduced into the filler 25 from above and is discharged sideway below the filler 25.

The inventor found out that, in order to effectively conduct drying of the exhaust gas 2 by the dryers 18, it is preferable to cool the exhaust gas 2 to be introduced into the dryers 18 to a temperature not to causing freezing of the moisture. Lowering of the temperature of the exhaust gas to be introduced into the dryers 18 enhances dehumidification effect by the dryers 18 owing to lowered saturation temperature of water in the dryers 18, whereby the dryers 18 can be made reduced in size.

In the filler built-in cooler 20, the exhaust gas 2 is cooled by the cooling pipe 24 to a temperature not to causing freezing of the moisture, so that drain D3 is produced in the cooling space 21 and is stored in a drain reservoir 27 at a bottom of the cooling space 21. Then, the drain D3 in the drain reservoir 27 is supplied by the pump 28 to the spray nozzles 26 for injection.

In order to reduce cooling load in the filler built-in cooler 20, arranged upstream of the filler built-in cooler 20 is an auxiliary cooler 29 to which introduced is the drain D3 through a discharge valve 31 with the drain reservoir 27 in the filler built-in cooler 20 being controlled to a constant level, using a level gauge 30, and the auxiliary cooler 29 cools the exhaust gas 2, using the drain D3. Drain is produced also in the auxiliary cooler 29 since introduced into the auxiliary cooler 29 for cooling is the drain D3 having being cooled in the filler built-in cooler 20 to the temperature not causing freezing of the moisture in the exhaust gas 2, the resultant drain being joined to and discharged together with the drain D3 having cooled the auxiliary cooler 29.

The inventor found out that, when the compressors 16a and 16b successively compress the exhaust gas 2, pH of the drains increase as the pressure is increased. Since pressurization up to 2.5 MPa is conducted in the third and fourth compressors 16b, the drain D2 discharged from the aftercoolers 17b and the drain D3 downstream thereof are found out to exhibit higher pH of 9 or more.

In FIG. 3, arranged is an alkaline solution addition device 67 to which the drains D1, D2 and D3 are introduced to produce and supply the alkaline solution 54a.

The alkaline solution addition device 67 has a tank 84 which receives the drains D1, D2 and D3. The tank 84 is provided with a level controller 85 which detects a level of drain D', e.g., a mixture of drains D1, D2 and D3 and controls an opening degree of a discharge valve 76 at a drain outlet (on a downstream side) of the tank 84 so as to always keep constant a detected level. Part of the drain D' in the tank 84 is discharged by a pump 77 and is supplied as alkaline solution 54a to the drain-receiving tank 65 for the exhaust gas purification device 50.

Surplus drain 64 discharged from the drain-receiving tank 65 for the exhaust gas purification device 50 is supplied to the alkaline control vessel 78. Supply of an alkaline agent 79 such as sodium hydroxide to the alkaline control vessel 78 produces the alkaline solution 54a kept to a predetermined pH.

Then, the alkaline solution 54a in the alkaline control vessel 78 is mixed by a pump 80 with the drain D' from the tank 84 at an inlet side of the pump 77 and is supplied to the drain-receiving tank 65.

The tank 84 is provided with a pH sensor 81 which measures pH of the drain D', a detected pH value 81a by the pH sensor 81 being inputted to the alkaline controller 82. The alkaline controller 82 controls the pump 80 so as to keep constant the detected pH value 81a by the pH sensor 81 and regulate a supply of the alkaline solution 54a from the alkaline control vessel 78 to the inlet side of the pump 77.

Also inputted to the alkaline controller 82 is a detected impurity value 83a by an impurity sensor 83 arranged on an outlet side of the filler built-in cooler 20 for detection of impurities (for example, sulfur oxides and nitrogen oxides) in the exhaust gas 2. When the detected impurity value 83a by the impurity sensor 83 exceeds a preset value, the alkaline controller 82 urgently controls the pump 80 to increase the supply of the alkaline solution 54a.

Supplied to the backwashing device 63 for the exhaust gas purification device 50 is compressed $CO_2$ gas 59' compressed by the first and second compressors 16a as compressed gas 59 for backwashing.

Mode of operation in FIG. 3 embodiment is as follows.

In FIG. 3 embodiment, since the exhaust gas purification device 50 with the auxiliary desulfurizing portion 4' is arranged between the wet desulfurizer 4 and the compressors 16a in the $CO_2$ recovery apparatus 15, the granular and gaseous impurities such as calcium sulfate in the exhaust gas 2 from the wet desulfurizer 4 are removed by the exhaust gas purification device 50 at higher removal ratio. Thus, introduced into the $CO_2$ recovery apparatus 15 is clean exhaust gas 2, which prevents calcium sulfate particles from being attached to and accumulated on the compressors 16a and 16b and the like of the $CO_2$ recovery apparatus 15.

The drains D1, D2 and D3 produced in the compression and cooling processes in the $CO_2$ recovery apparatus 15 are introduced into the alkaline solution addition device 67 for production of the alkaline solution 54a, so that water for purification of the exhaust gas 2 by the alkaline solution 54 in the exhaust gas purification device 50 can be gotten from the $CO_2$ recovery apparatus 15. Thus, the $CO_2$ recovery system for the oxyfuel combustor can be worked out even in a region where water is hardly available.

Further, supplied to the backwashing device 63 is the compressed $CO_2$ gas 59' on the outlet sides of the first and second compressors 16a as compressed gas 59 for backwashing, so that there is no need of separately preparing compressed gas for backwashing of the bag filters 56.

In FIG. 3, description is made on the $CO_2$ recovery system to which the exhaust gas purification device 50 in FIG. 1 is applied. However, the exhaust gas purification device 50 with the first and second vessel bodies 53a and 53b shown in FIG. 2 may be alternatively applied to the $CO_2$ recovery system; also in this case, effects and advantages similar to those in FIG. 3 embodiment can be exhibited.

Figure 4:
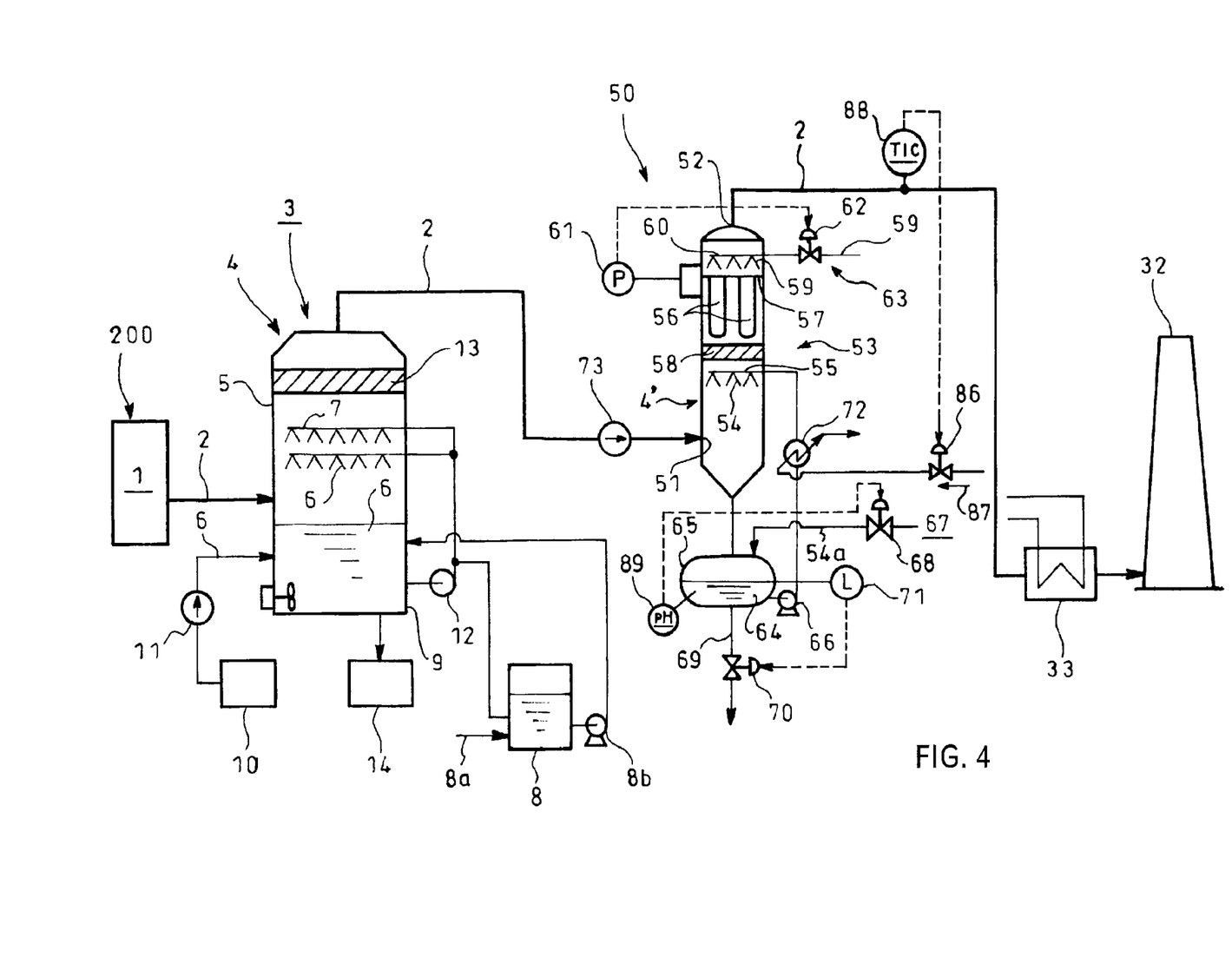
FIG. 4 is a block diagram showing an embodiment with an exhaust gas purification device applied to an air combustor.

FIG. 4 shows an embodiment in which the exhaust gas purification device 50 in FIG. 1 is applied downstream of the wet desulfurizer 4 for the air combustor 200. In FIG. 4 embodiment, arranged downstream of the exhaust gas purification device 50 is a stack 32 just upstream of which arranged is a reheater 33 which enhances a temperature of the exhaust gas 2 fed to the stack 32 by conducting heat exchange with the exhaust gas 2 downstream of the wet desulfurizer 4, thereby preventing white smoke from being produced.

Mode of operation in FIG. 4 embodiment is as follows.

Discharged from the wet desulfurizer 4 for the air combustor 200 is the exhaust gas with part of impurities remaining. When such exhaust gas 2 is introduced into the vessel body 53 in the exhaust gas purification device 50, the granulous and gaseous impurities remaining in the exhaust gas 2 are effectively removed by the alkaline solution 54 injected through the injection nozzles 55 for the auxiliary desulfurizing portion 4'.

In this manner, the calcium sulfate particles in the exhaust gas 2 are effectively removed by the exhaust gas purification device 50, so that prevented is the calcium sulfate particles from being attached to and accumulated on the reheater 33 and inside of the stack 32. Thus, relieved is maintenance work for removal of the particles attached and accumulated.

In FIG. 4 embodiment, description is made on application of the exhaust gas purification device 50 in FIG. 1 to the air combustor 200; however, the exhaust gas purification device 50 having the first and second vessel bodies 53a an 53b shown in FIG. 2 may be alternatively applied. Also in this case, effects similar to those in FIG. 4 embodiment can be obtained.

It is to be understood that an exhaust gas purification device and a $CO_2$ recovery system according to the disclosure is not limited to the above embodiments and that various changes and modifications may be made without departing from the scope of the disclosure.

REFERENCE SIGNS LIST 1 combustor
2 exhaust gas
3 exhaust gas treatment device
4 wet desulfurizer
4' auxiliary desulfurizing portion
15 $CO_2$ recovery apparatus
16a first and second compressors (compressors)
16b third and fourth compressors (compressors)
17a aftercooler
17b aftercooler
19 carbon dioxide liquefier
50 exhaust gas purification device
51 inlet
52 outlet
53 vessel body
53a vessel body
53b vessel body
54 alkaline solution
54a alkaline solution
55 injection nozzle
56 bag filter
57 mounting plate
58 mist eliminator
59 compressed gas
59' Compressed CO2 gas
60 backwashing nozzle
63 backwashing device
64 drain
65 drain-receiving tank
65a drain-receiving tank
65b drain-receiving tank
66 supply pump
67 alkaline solution addition device
74a changeover valve
74a' changeover valve
74b changeover valve
74b' changeover valve
100 oxyfuel combustor
200 air combustor
D1 drain
D2 drain
D3 drain

The invention claimed is:

1. A $CO_2$ recovery system comprising:
an oxyfuel combustor, a $CO_2$ recovery apparatus, a wet desulfurizer and an exhaust gas purification device,
wherein the $CO_2$ recovery apparatus is downstream of the wet desulfurizer and is arranged for the oxyfuel combustor to conduct exhaust gas treatment, and
wherein the $CO_2$ recovery apparatus comprises at least compressors and aftercoolers for cooling exhaust gas compressed by the compressors to thereby discharge condensed drains, thereby liquefying $CO_2$, and
wherein the exhaust gas purification device is between the wet desulfurizer and the compressors, and
wherein the exhaust gas purification device comprises:
a vessel body with an inlet and an outlet at a lower portion and a top end thereof, respectively, exhaust gas discharged from the wet desulfurizer being introduced into and discharged from the vessel body through the inlet and the outlet, respectively,
an auxiliary desulfurizing portion having injection nozzles for injecting an alkaline solution at a position in the vessel body above the inlet to purify the exhaust gas,
bag filters fixed through a mounting plate to the vessel body at a position in the vessel body above the injection nozzles for separating particles in the exhaust gas purified with the alkaline solution,
a backwashing device comprising backwashing nozzles arranged above the bag filters for injecting compressed gas to backwash the bag filters, and piping for supplying the compressed gas compressed by the compressors to the backwashing nozzles,
a mist eliminator arranged in the vessel body at a position between the injection nozzles, and the bag filters above the injection nozzles,
a drain-receiving tank for receiving drain from the vessel body,
a supply pump for supplying the drain in the drain receiving tank as at least part of the alkaline solution to the injection nozzles, and
an alkaline solution addition device for supplying to the drain-receiving tank the alkaline solution obtained by adjusting pH of the drains from the aftercoolers, and
wherein the wet desulfurizer is a lime/gypsum wet desulfurizer and is the first desulfurizer downstream of the oxyfuel combustor.

2. The $CO_2$ recovery system as claimed in claim 1 wherein the backwashing device is adapted to detect any differential pressure between upstream and downstream sides of the bag filters and conducting backwashing using the backwashing nozzles on the basis of a detected differential pressure.

3. The $CO_2$ recovery system as claimed in claim 1, wherein the vessel body comprises first and second vessel bodies with changeover valves for changeover of a state that the exhaust gas is passed through the first vessel body and a state that the exhaust gas is passed through the second vessel body.

4. The $CO_2$ recovery system as claimed in claim 1, wherein the vessel body is a vertically elongated cylinder having a domed top end and a conical bottom end, and the mist eliminator spans the inner width of the vessel body.

5. The $CO_2$ recovery system as claimed in claim 1, wherein at least one of the compressors of the $CO_2$ recovery apparatus is configured to provide the exhaust gas compressed by the compressors only downstream of the $CO_2$ recovery apparatus.

6. The $CO_2$ recovery system as claimed in claim 1, further comprising a differential pressure sensor configured to detect a pressure difference between upstream and downstream sides of the bag filters.

\* \* \* \* \*